Patented Aug. 16, 1938

2,126,830

UNITED STATES PATENT OFFICE 2,126,830

COMPOSITE FABRIC AND METHOD OF MAKING SAME

Arthur Bruce Snowdon, Hillsdale, N. J., and Henry R. Bodell, Ossining, N. Y., assignors to Celanese Corporation of America, a corporation of Delaware No Drawing. Application October 21, 1936, Serial No. 106,802. Renewed May 6, 1938

11 Claims. (Cl. 154—2)

This invention relates to the preparation of stiffened fabrics and also to wearing apparel or other technical or commercial articles formed in whole or in part of such stiffened fabrics.

An object of this invention is to prepare fabrics of any desired degree of increased stiffness and in a simple and expeditious manner. A further object of this invention is to prepare wearing apparel and other technical and industrial articles consisting of or containing stiffened fabric. Other objects of the invention will appear from the following detailed description.

We have found that in processes for making stiffened fabrics by causing cellulose acetate or other organic derivative of cellulose to melt or coalesce and effect a lamination of two or more fabrics by operations involving the application of heat and pressure, there is a definite relation between the amount of heat and pressure applied and the type of article produced. For instance, by regulation of the heat and the pressure during the lamination, similar sets of fabrics may be laminated to produce a textile article which feels and crackles like paper, or a stiffened article having the appearance and feel very much like the exposed layers of fabric in the assembly before they are subjected to the laminating process. The adhesion of the fabrics to each other is substantially the same in both cases and both types of stiffened material will stand about the same number of launderings before blistering or otherwise breaking down.

When plasticizers for the cellulose acetate are present in the assembly containing cellulose acetate and fabrics to be united thereby, good stiffening effects and firm adhesion may be obtained by the application of heat and pressure if water or moisture is present during the pressing. We have found that a better adhesion of the layers of fabric and a more desirable product is formed if the assembled fabrics are first subjected to dry heat and pressure to effect a tacking together of the fabrics and then the coalescing of the fabrics completed by subjecting the partially coalesced assembly to heat and pressure in the presence of liquids, especially water. We have also found that by this method not only is a better adhesion of the layers effected and a more desirable product formed, but that the articles are produced more easily and expeditiously.

In accordance with our invention we prepare fabrics of an increased stiffness, and articles made from such stiffened fabrics, by a method wherein a plurality of layers of fabric, at least one of which contains an organic derivative of cellulose, are coalesced together by being first subjected to heat and pressure while dry and then subjected to heat and pressure in the presence of moisture. Also, in accordance with this invention, we regulate temperature and pressure during the coalescing operation or operations to produce an article which feels and crackles like paper, or a stiffened wrinkle-proof article which has the feel of the outside layers of fabric before lamination.

The products formed by this invention may be used for any purpose where a stiffened and/or relatively impermeable fabric is desired. An important application of such products is wearing apparel which may be formed in whole or in part of fabrics made or prepared in accordance with this invention. Thus, collars or cuffs may be formed entirely of the product of this invention. Alternatively, shirts may be made wherein the attached collars, neckbands, cuffs, fronts or bosoms are made of such products. Hats or parts of hats may likewise be formed of such material, as may also be the inner or sweat bands of hats, visors for caps, cuffs of gauntlets, inner linings for cravats, stiffening material used in the inner portions of garments, such as coats, to help retain the shape thereof, shoes and parts thereof, etc. The fabrics of this invention may be used for a variety of other purposes, and indeed may be used for any industrial or technical purpose where fabric of increased stiffness and/or impermeability is required.

In order that the desired degree of stiffness and adhesion be obtained upon the hot pressing in the presence of water, it is of importance that there also be present in the assembly being treated a plasticizer or relatively high boiling or non-volatile solvent for the derivative of cellulose employed. This plasticizer may be caused to be present in any manner. Thus, it may be incorporated with the derivative of cellulose in whatever form it may be present, either by way of dope or spinning solution from which the yarns of the derivative of cellulose are formed or by spraying, dipping or otherwise treating the derivative of cellulose or fabric containing the same with a solution of the plasticizer in volatile solvent or thinner such as benzol, or preferably ethyl or methyl alcohol or other swelling or penetrating agent for the derivative of cellulose and permitting the solvent to evaporate.

Any suitable plasticizer or mixtures of plasticizers may be employed. Examples of suitable plasticizers for cellulose acetate, for example, are dimethoxyethyl phthalate, triacetin, diacetin diethoxyethyl phthalate, etc. In some cases it is advantageous to employ a mixture of water-soluble and water-insoluble plasticizers so that upon subsequent laundering the whole or part of the water-soluble plasticizer is removed. The amount of plasticizer present in the fabric containing same is between 35 and 50% or more on the weight of said fabric. The preferred plasticizer employed is a mixture of dimethoxyethyl phthalate and triacetin. The proportions of triacetin to dimethoxyethyl phthalate can be from 10% of triacetin with respect to the dimethoxyethyl phthalate present to equal proportions of each.

Small amounts of other plasticizers, swelling agents or similar materials may also be added to the mixture of dimethoxyethyl phthalate and triacetin, such as from 5 to 20% on the weight of said mixture of tricresyl phosphate, camphor and the like.

The plasticizer or plasticizer compound may be applied to the desired fabric in any suitable manner, such as by dipping, spraying, padding, etc. It is preferable when employing the dimethoxyethyl phthalate and triacetin mixture above specified to apply the same by dipping the fabric into a solution of the plasticizer in ethyl or methyl alcohol, preferably ethyl alcohol. Other solvents and thinners for the plasticizer which also has a slight swelling action on the derivative of cellulose, i. e. cellulose acetate, may be employed. Any amount of solvent may be employed for this purpose, for instance, from 10 to 90 or more percent on the weight of the plasticizer of ethyl alcohol may be employed. The fabric is dipped into this solution and passed through a pair of squeeze rollers regulated with sufficient pressure that the desired quantity of plasticizer remains on the fabric. After treating the fabric with the plasticizer in the solvent or thinner, the solvent or thinner is allowed to evaporate. The evaporation of the solvent or thinner may be hastened by the application of heat. It is preferable to have from 30 to 35% on the weight of the fabric of plasticizer whether the fabric is 100% cellulose acetate, or only 30% cellulose acetate and the remaining part cotton.

After applying plasticizer to fabrics containing cellulose acetate, it is preferable to roll the same with a sheet of oiled paper (Glassine) in such a manner that the paper prevents contact of one layer of the cellulose acetate fabric with another layer of the same fabric. This prevents fabric from adhering to itself and also prevents, when unrolling the fabric, one layer of fabric from pulling all the cellulose acetate from a contacting layer.

In one form of the invention the assembly of fabrics, with an intermediate layer comprising cellulose acetate, employed as a starting material may first be cut, sewn or otherwise shaped. After the desired articles, such as collars, cuffs or other wearing apparel or parts thereof are formed, and plasticizer being present therein, they may be subjected to heat and pressure to cause a tacking together of the fabrics. The articles, such as collars, cuffs, etc. may then be attached to the neckband or sleeves of the shirt and then dampened with water and subjected to heat and pressure to impart the desired stiffness, impermeability and feel. When the assembled fabrics are sewn into an article and dry-fused first, the original shape of the article is retained when applying the moisture to the article for the wet fusing operation which follows. Dampening of the articles without first dry-fusing tends to change the shape of the collar, cuff or other article to such an extent that it is impossible to get it back to its original shape. After dry-fusing, dampening of the article is more readily effected as moisture applied to one side of the collar, cuff, etc., quickly penetrates to the other side. By dry-fusing the collar first it becomes mechanically possible to wet-fuse the collar top when the neckband is pressed in the final collar pressing operation. It is preferable, when moistening the dry-fused collar, cuff or other article, not to moisten the heavy hems where there are several additional plies of fabric as this tends to absorb an excessive amount of water causing, during the coalescing operation, a glazing of the fabric at the hems due to the greater fluidity of the thermoplastic material at those points.

Products of this invention have any desired degree of stiffness which is relatively permanent, so that they may be subjected to repeated launderings without substantially losing their stiffness or forming blisters. In this manner the use of starch, or other extraneous stiffening materials during laundering may be avoided.

This invention may be carried out in a large number of ways, particularly as to the nature of the fabric or number of fabrics employed, provided that cellulose acetate or other organic derivative of cellulose in any form, such as powder, film or yarns or filaments, is present in a fabric of the assembly.

If the cellulose acetate is present in the form of yarns or filaments, there should be present in the product treated at least one layer of fabric, which either consists wholly of cellulose acetate or one alternating either in the warp or in the weft or both, in any desired degree of alternation, with yarns of other non-thermoplastic fibres such as cotton, regenerated cellulose, linen, wool or natural silk. This alteration may be, for instance, 1, 2, 3 or more cellulose acetate yarns with 1, 2, 3 or more yarns of cotton or other non-thermoplastic fibres. For convenience the warp may be made with such alternation of cellulose acetate yarn and yarn of other fibres, while the weft may consist wholly of such cellulose acetate yarn or wholly of yarn of other fibres. However, the weft may consist of an alternation of such cellulose acetate yarns and non-thermoplastic yarns of other fibres, in which case if the fabric is made in ordinary looms, the alternations will be used in which either the warp or the weft consists wholly of cellulose acetate yarn while the other component consists of non-thermoplastic yarn.

Instead of employing a woven fabric, a knitted or netted fabric may be employed. Also a fabric containing mixed yarn containing both filaments of cellulose acetate and fibres of cotton or other non-thermoplastic material may be employed.

In another, and in some cases preferred method of carrying out this invention, one or more fabrics consisting wholly of non-thermoplastic yarns, such as cotton, linen, reconstituted cellulose, wool or silk, is assembled with one or more fabrics consisting wholly of cellulose acetate yarn or of a mixture of cellulose acetate yarn and filaments and yarn of non-thermoplastic fibres, as above described, may be treated in accordance with this invention, whereby a composite fabric made up of a plurality of layers may be made. If a product is to be produced wherein all the layers thereof are united, it is of importance, where two or more layers of fabric consisting wholly of non-thermoplastic material are used, that at least one layer of fabric consisting of or containing cellulose acetate yarn be interposed between each two layers of such fabric.

The layer of cellulose acetate that is interposed between the fabrics may be in the form of finely divided powder with which a plasticizer may or may not be in intimate admixture. This powder may be blown or sprayed on to one or more layers of the fabric to be laminated and if desired gums or other appropriate binders may be employed to cause such powder to adhere to the fabrics.

In still another form of this invention, a fabric made of or containing non-thermoplastic fibres may be coated or impregnated with an intimate mixture of finely divided cellulose acetate with or without plasticizers, and binders or agglutinants such as methyl cellulose that swells in water, gum tragacanth, gum arabic, and this fabric is then interposed between two or more layers of fabric which consist wholly of non-thermoplastic fibres, such as cotton, linen, regenerated cellulose, wool, or natural silk.

In the case of cellulose acetate yarns, fabrics impregnated with solutions of cellulose acetate, powder and the like above described, wherein plasticizers are not incorporated during manufacture, such plasticizer may be added to such cellulose acetate products after they are formed or to the fabric of non-thermoplastic yarns with which they are laminated.

In order to increase the opacity of the final product or to impart special color effects thereto, finely divided white pigments such as titanium dioxide or antimony trioxide or colored pigments such as lamp black may be incorporated with the cellulose acetate.

Where the coalescible fabric is formed by weaving or knitting yarns containing cellulose acetate with or without textile yarns such as cotton, linen, real silk, etc., it is preferable to so weave the yarns of cellulose acetate or other organic derivative of cellulose that they form floats on the surface of the fabric. In such a fabric the cellulose acetate or other organic derivative of cellulose yarns may be substantially destroyed in the coalescing action without weakening the fabric, as they are contained in the fabric only as floats and not as a part of the fundamental structure thereof.

To obtain good adhesion, water should be present during at least one application of heat and pressure in accordance with this invention. The liquid may be applied to the assembly of fabrics having an intermediate layer containing cellulose acetate in any suitable manner, such as by dipping, spraying or brushing. A convenient manner of wetting the assembly is by padding the same with a moistened sponge. Articles of more or less rigid material may be formed by adding either cold water starch or boiled starch to the water applied prior to the final pressing operation. Thus a solution of starch may be applied to the assembly to furnish the necessary moisture for the coalescing operation.

If heated devices that have desired designs, such as stripes, dots, rectangles or other geometric, floral or other figures, embossed thereon are employed, novel effects are obtained, since only those portions that come in contact with the embossed surfaces of the heated device become united, while the other portions retain the properties of the original fabrics. This local application of heat and pressure may be done by manually operated means if desired. By locally applying the plasticizer, or having present the plasticizer only in those places which are to be united, the union of other portions upon subsequent laundering is avoided.

The temperature employed in either the dry-fusing operation or wet fusing operation, whether both are used or not, may vary between 100° C. and 200° C. for cellulose acetate, while the pressure may vary from 20 lbs. per square inch up to 110 or more lbs. per square inch. It is of importance, however, to obtain the desired feel of the resulting article to select the temperature and pressure which will result in that desired feel or texture. For instance, if temperatures above 139° C. are employed there results an article which has a papery feel although low or high pressures are employed. When employing those temperatures above 139° C. however, pressures should not be employed much above 65 lbs. per square inch or there is a tendency for the plastic material to create besides the papery feel a glazed effect on the resulting product. While, if temperatures between 100° C. and 139° C. (for cellulose acetate) and pressures from 65 lbs. per square inch to 110 lbs. or more per square inch are employed, there is produced a strongly laminated fabric which is not papery and in which the surface fabric is unaltered.

In order to further illustrate our invention but without being limited thereto, the following examples are given:

*Example I.*—A fabric consisting of 35% of yarns of cellulose acetate and 65% of yarns of cotton woven with the cellulose acetate yarns as floats of two picks on the surface of the fabric has applied thereto, by dipping, a mixture of dimethoxyethyl phthalate, triacetin and alcohol as plasticizer. The fabric has thereon between 43 and 45% of the mixture consisting of 60 parts of dimethoxyethyl phthalate and 10 parts of triacetin upon evaporation of the alcohol.

The fabric formed is interposed as an intermediate layer between two layers of fabric consisting solely of cotton fibres and woven as a broadcloth. The fabric is cut in a form adapted to be sewn into a collar for a man's shirt. The assembly is subjected to a dry fusing, i. e. no moisture is applied, and subjected to a temperature of from 125° C. to 139° C. and a pressure of from 65 to 85 lbs. per square inch. The article thus formed is then sewed to a neckband of a shirt, the assembly moistened with water and subjected to the same heat and pressure. The collar produced is pliable, partially permeable yet wrinkle-proof and exhibits no glazed surface or paper-like feel.

*Example II.*—The same assembly as above is subjected to a temperature of from 139° C. to 180° C. and a pressure of about 65 lbs. per square inch in both the dry and wet fusing operations. The collar produced is pliable, less permeable than that produced by Example I yet wrinkle-proof and exhibits no glazed portions although it has a solid papery feel when crushed or wrinkled by the hand.

While this invention has been described particularly in connection with cellulose acetate, such cellulose acetate may be replaced in whole or in part by other derivatives of cellulose such as cellulose nitrate, or cellulose formate, cellulose propionate, cellulose butyrate, or other organic esters of cellulose; or methyl cellulose, ethyl cellulose and benzyl cellulose, or other cellulose ethers.

It is preferable in the forming of collars, cuffs, etc. to have a coalescible fabric bleached and/or blued the same as the cotton outer fabrics and also to have the coalescible fabric shrunk the same as the outer fabric. For instance, if the cotton muslin, broadcloth or other shirting material is Sanforized, the coalescible fabric should also be Sanforized. While, if the outer fabric is shrunk by boiling in water, a similar shrinking should be given the coalescible fabric.

It is to be understood that the foregoing detailed description is given merely by way of illustration and many variations may be made therein, without departing from the spirit of our invention.

Having described our invention, what we desire to secure by Letters Patent is:

1. Process for the production of stiffened fabrics having wrinkle-proof properties, which comprise uniting a plurality of layers of fabric, at least one of which contains a thermoplastic organic derivative of cellulose, by applying heat and pressure at least locally to the assembled layers in the presence of a plasticizer for the organic derivative of cellulose, the heat and pressure being applied firstly in the substantial absence of moisture and then in the presence of moisture.

2. Process for the production of stiffened fabrics having wrinkle-proof properties, which comprises uniting a plurality of layers of fabric, at least one of which contains cellulose acetate, by applying heat and pressure at least locally to the assembled layers in the presence of a plasticizer for the cellulose acetate, the heat and pressure being applied firstly in the substantial absence of moisture and then in the presence of moisture.

3. Process for the production of stiffened fabrics having wrinkle-proof properties, which comprises uniting a plurality of layers of fabric, at least one of which contains cellulose acetate, by applying heat at a temperature of from 125 to 139° C. and pressure at least locally to the assembled layers in the presence of a plasticizer for the cellulose acetate, the heat and pressure being applied firstly in the substantial absence of moisture and then in the presence of moisture.

4. Process for the production of stiffened fabrics having wrinkle-proof properties, which comprises uniting a plurality of layers of fabric, at least one of which contains cellulose acetate, by subjecting the assembled layers, at least locally, to a pressure of 65 to 110 lbs. per square inch and a temperature of 125 to 139° C. in the presence of a plasticizer for the cellulose acetate, the heat and pressure being applied firstly in the substantial absence of moisture and then in the presence of moisture.

5. Process for the production of stiffened fabrics having wrinkle-proof properties, which comprises uniting two layers of fabric composed of non-thermoplastic material to an intermediate layer of fabric containing a thermoplastic organic derivative of cellulose by applying heat and pressure to the assembled layers in the presence of a plasticizer for the organic derivative of cellulose, the heat and pressure being applied firstly in the substantial absence of moisture and then in the presence of moisture.

6. Process for the production of stiffened fabrics having wrinkle-proof properties, which comprises uniting two layers of fabric composed of non-thermoplastic material to an intermediate layer of fabric containing cellulose acetate by applying heat and pressure to the assembled layers in the presence of a plasticizer for the cellulose acetate, the heat and pressure being applied firstly in the substantial absence of moisture and then in the presence of moisture.

7. Process for the production of stiffened fabrics having wrinkle-proof properties, which comprises uniting two layers of fabric composed of non-thermoplastic material to an intermediate layer of fabric containing yarns of a thermoplastic organic derivative of cellulose by applying heat and pressure to the assembled layers in the presence of a plasticizer for the organic derivative of cellulose, the heat and pressure being applied firstly in the substantial absence of moisture and then in the presence of moisture.

8. Process for the production of stiffened fabrics having wrinkle-proof properties, which comprises uniting two layers of fabric composed of non-thermoplastic material to an intermediate layer of fabric containing yarns of cellulose acetate by applying heat and pressure to the assembled layers in the presence of a plasticizer for the cellulose acetate, the heat and pressure being applied firstly in the substantial absence of moisture and then in the presence of moisture.

9. Process for the production of stiffened fabrics having wrinkle-proof properties, which comprises uniting two layers of fabric composed of non-thermoplastic material to an intermediate layer of fabric containing cellulose acetate, pressing the assembled layers at a temperature of between 125 and 139° C. in the presence of a plasticizer for the cellulose acetate, the heat and pressure being applied firstly in the substantial absence of moisture and then in the presence of moisture.

10. Process for the production of stiffened fabrics having wrinkle-proof properties, which comprises uniting two layers of fabric composed of non-thermoplastic material to an intermediate layer of fabric containing yarns of cellulose acetate by pressing the assembled layers at a temperature between 125 and 139° C. in the presence of a plasticizer for the cellulose acetate, the heat and pressure being applied firstly in the substantial absence of moisture and then in the presence of moisture.

11. Process for the production of stiffened fabrics having wrinkle-proof properties, which comprises uniting two layers of fabric composed of non-thermoplastic material to an intermediate layer of fabric containing cellulose acetate by subjecting the assembled layers to a pressure between 65 and 110 lbs. per square inch at a temperature between 125 and 139° C. in the presence of a plasticizer for the cellulose acetate, the heat and pressure being applied firstly in the substantial absence of moisture and then in the presence of moisture.

ARTHUR BRUCE SNOWDON.
HENRY R. BODELL.